(12) United States Patent
Schulz

(10) Patent No.: US 10,859,078 B2
(45) Date of Patent: Dec. 8, 2020

(54) POPPET VALVE

(71) Applicant: BURCKHARDT COMPRESSION AG, Winterthur (CH)

(72) Inventor: Reiner Schulz, Lottstetten (DE)

(73) Assignee: BURCKHARDT COMPRESSION AG, Winterthur (CH)

( * ) Notice: Subject to any disclaimer, the term of this patent is extended or adjusted under 35 U.S.C. 154(b) by 110 days.

(21) Appl. No.: 15/767,598

(22) PCT Filed: Oct. 12, 2016

(86) PCT No.: PCT/EP2016/074520
§ 371 (c)(1),
(2) Date: Apr. 11, 2018

(87) PCT Pub. No.: WO2017/064150
PCT Pub. Date: Apr. 20, 2017

(65) Prior Publication Data
US 2018/0306176 A1    Oct. 25, 2018

(30) Foreign Application Priority Data

Oct. 12, 2015   (EP) .................................... 15189428

(51) Int. Cl.
*F04B 39/10* (2006.01)
*F16K 15/02* (2006.01)
*F16K 15/06* (2006.01)

(52) U.S. Cl.
CPC ........ *F04B 39/1013* (2013.01); *F16K 15/026* (2013.01); *F16K 15/028* (2013.01); *F16K 15/063* (2013.01); *Y10T 137/7839* (2015.04)

(58) Field of Classification Search
CPC ......... Y10T 137/7838; Y10T 137/7931; Y10T 137/7839; Y10T 137/7869; F04B 39/1013; F16K 15/026; F16K 15/028; F16K 15/063

See application file for complete search history.

(56) References Cited

U.S. PATENT DOCUMENTS

| 72,363 A | 12/1867 | Cameron |
|---|---|---|
| 717,029 A | 12/1902 | Reynolds |

(Continued)

FOREIGN PATENT DOCUMENTS

| AT | 412302 | 12/2004 |
|---|---|---|
| CN | 1249535 A | 4/2000 |

(Continued)

OTHER PUBLICATIONS

International Search Report for PCT/EP2016/074520, English Translation attached to original, Both completed by the European Patent Office dated Jan. 30, 2017, All together 7 Pages.

(Continued)

*Primary Examiner* — Marina A Tietjen
*Assistant Examiner* — Frederick D Soski
(74) *Attorney, Agent, or Firm* — Brooks Kushman P.C.

(57) ABSTRACT

Poppet valve for a piston compressor, having a valve body with a plurality of inlet ducts, wherein each inlet duct has an inlet section and an outlet section. The outlet section opens into a valve seat, wherein each inlet duct is assigned a closing element and a spring. The closing element can be moved in an axial direction (A) in such a way that the valve seat can be closed by way of the closing element. The spring has a first spring end section and a second spring end section, wherein the spring is arranged in the inlet duct and bears with the first spring end section against and is held on the inlet section of the inlet duct. The second spring end section is connected to the closing element, to bring about a pre-stressing force on the closing element, which pre-stressing force is oriented towards the valve seat.

18 Claims, 11 Drawing Sheets

(56) References Cited

U.S. PATENT DOCUMENTS

| | | | |
|---|---|---|---|
| 765,200 A | 7/1904 | Schmidt | |
| 1,445,073 A | 2/1923 | Corpi et al. | |
| 1,507,448 A | 9/1924 | Aldrich | |
| 1,516,846 A | 11/1924 | Dever | |
| 2,000,691 A * | 5/1935 | Collins | F04B 39/1033 137/535 |
| 2,023,189 A | 12/1935 | Armstrong | |
| 2,125,137 A * | 7/1938 | Turnwald | F04B 39/1033 137/331 |
| 2,624,587 A * | 1/1953 | Watson | F16K 15/063 137/454.4 |
| 2,658,737 A * | 11/1953 | Nutter | B01D 3/163 261/114.4 |
| 2,809,660 A | 10/1957 | Becker | |
| 3,148,697 A * | 9/1964 | Carr | F04B 39/1006 137/327 |
| 3,177,893 A * | 4/1965 | King | F04B 39/102 137/512.1 |
| 3,332,437 A * | 7/1967 | Hallén | F16K 1/385 137/516.29 |
| 3,336,942 A * | 8/1967 | Keith | F16K 15/026 137/529 |
| 3,347,264 A * | 10/1967 | Bunn | F04B 39/102 137/512.1 |
| 3,357,449 A * | 12/1967 | King | F16K 15/08 137/512.1 |
| 3,358,710 A * | 12/1967 | Page | F04B 39/1053 137/512.1 |
| 3,369,563 A * | 2/1968 | Deminger | F16K 15/08 137/514 |
| 3,489,172 A * | 1/1970 | Whitmore | G05D 7/0126 137/512.1 |
| 3,536,094 A * | 10/1970 | Manley, Jr. | F16K 15/08 137/512.1 |
| 3,602,247 A * | 8/1971 | Bunn | F04B 39/1013 137/270 |
| 3,701,361 A * | 10/1972 | Bunn | F16K 1/34 137/543.23 |
| 3,786,834 A * | 1/1974 | Garland | F16K 15/08 137/540 |
| 3,829,253 A * | 8/1974 | Bunn | F04B 39/1053 417/504 |
| 4,184,508 A * | 1/1980 | Mayer | F04B 39/1053 137/512.1 |
| 4,278,106 A * | 7/1981 | Cunningham | F04B 39/1033 137/512.1 |
| 4,307,751 A * | 12/1981 | Mayer | F16K 15/08 137/454.4 |
| 4,483,363 A * | 11/1984 | Madoche | F04B 39/1033 137/329.04 |
| 4,489,752 A | 12/1984 | Deminski | |
| 4,526,195 A * | 7/1985 | Humphrey | B23P 15/001 137/512.1 |
| 4,607,660 A * | 8/1986 | Bennitt | F16K 15/023 137/512.1 |
| 4,819,689 A * | 4/1989 | Owsley | F04B 39/102 137/512.1 |
| 4,852,608 A * | 8/1989 | Bennitt | F04B 39/1053 137/516.13 |
| 4,869,289 A * | 9/1989 | Hrabal | F04B 39/10 137/512.1 |
| 4,872,481 A | 10/1989 | Shaw et al. | |
| 4,893,654 A | 1/1990 | Feuz | |
| 4,924,906 A * | 5/1990 | Hrabal | F04B 39/1033 137/512.1 |
| 5,052,434 A * | 10/1991 | Bauer | F04B 39/1033 137/512.1 |
| 5,207,242 A | 5/1993 | Daghe et al. | |
| 5,311,902 A * | 5/1994 | Overfield | F04B 39/10 137/512.1 |
| 5,483,992 A * | 1/1996 | Lehmann | F04B 39/1033 137/516.21 |
| 5,511,583 A | 4/1996 | Bassett | |
| 5,642,753 A * | 7/1997 | Thistle | F04B 49/243 137/512.1 |
| 5,678,603 A * | 10/1997 | Tschop | F04B 39/1033 137/512.1 |
| 6,206,058 B1 | 3/2001 | Nagel et al. | |
| 6,575,192 B1* | 6/2003 | Shaffer | F02B 19/12 137/514.5 |
| 6,581,632 B2 | 6/2003 | Walpole et al. | |
| 7,185,671 B2 | 3/2007 | Duex | |
| 7,434,593 B2 | 10/2008 | Noll et al. | |
| 7,533,692 B2* | 5/2009 | Walpole | F04B 39/1026 137/533.27 |
| 8,147,255 B2 | 4/2012 | Kuny | |
| 8,281,805 B2* | 10/2012 | Spiegl | F04B 39/1053 137/512.15 |
| 8,584,700 B2 | 11/2013 | Vicars | |
| 8,827,242 B2* | 9/2014 | Marica | F04B 23/10 251/294 |
| 9,309,878 B2 | 4/2016 | Columpsi | |
| 9,416,887 B2 | 8/2016 | Blume | |
| 9,523,436 B2* | 12/2016 | Mohamed | F04B 39/1013 |
| 2002/0144733 A1* | 10/2002 | Artner | F04B 39/1053 137/512.1 |
| 2003/0015240 A1* | 1/2003 | Nelson | F16K 15/026 137/541 |
| 2004/0016459 A1* | 1/2004 | Thompson | F16K 17/082 137/512.1 |
| 2007/0044848 A1 | 3/2007 | Norman | |
| 2008/0156381 A1* | 7/2008 | Tuymer | F04B 39/1053 137/512.1 |
| 2010/0025601 A1* | 2/2010 | Francini | F04B 39/1013 251/63.6 |
| 2010/0090149 A1 | 4/2010 | Thompson et al. | |
| 2011/0070113 A1 | 3/2011 | Mohamed | |
| 2013/0015385 A1 | 1/2013 | Marica | |
| 2013/0209298 A1 | 8/2013 | Gaertner et al. | |
| 2013/0251565 A1* | 9/2013 | Russell | F04B 39/102 417/559 |
| 2014/0312257 A1 | 10/2014 | Marica | |
| 2017/0089301 A1 | 3/2017 | Winkler et al. | |

FOREIGN PATENT DOCUMENTS

| | | |
|---|---|---|
| CN | 1276493 A | 12/2000 |
| CN | 1325363 A | 12/2001 |
| CN | 203098963 U | 7/2013 |
| DE | 466976 | 10/1928 |
| DE | 2211415 | 10/1972 |
| DE | 102007016898 | 10/2008 |
| DE | 102008029822 | 12/2009 |
| DE | 102010039516 | 2/2012 |
| EP | 1245881 | 10/2002 |
| EP | 2703647 | 3/2014 |
| GB | 500420 | 2/1939 |
| JP | 2009-92180 A | 4/2009 |
| JP | 2009121268 A | 6/2009 |
| JP | 2010025202 A | 2/2010 |
| JP | 2010-8957 A | 4/2010 |
| JP | 201089757 A | 4/2010 |
| JP | 2014125994 A | 7/2014 |

OTHER PUBLICATIONS

JP Office Action dated Oct. 17, 2018 for related Patent Application No. 2018-518645, together with English Translation. (11 pages).
CN Search report 2016800596341, dated Mar. 18, 2019.

\* cited by examiner

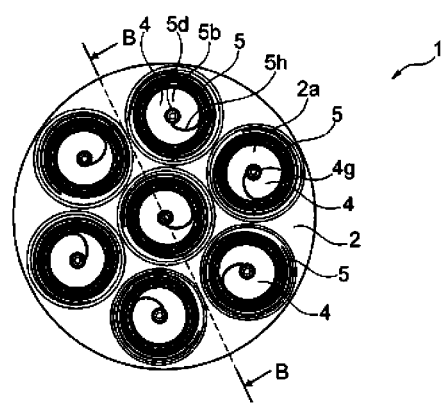
Fig. 1
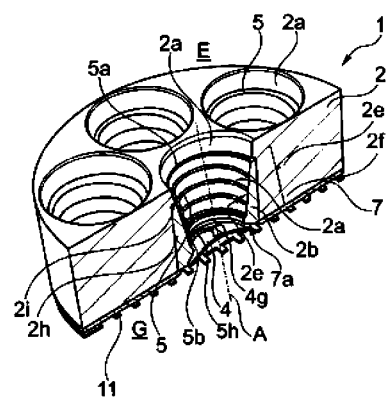
Fig. 2 (B - B)

POPPET VALVE
>
> ## CROSS-REFERENCE TO RELATED APPLICATION
>
> This application is the U.S. national phase of PCT Application No. PCT/EP16/074520 filed on Oct. 12, 2016, which claims priority to EP Patent Application No. 15189428.4 filed on Oct. 12, 2015, the disclosures of which are incorporated in their entirety by reference herein.
>
> The invention relates to a poppet valve for a piston compressor.
>
> ## PRIOR ART
>
> The document DE466976 discloses, in FIG. 1, a disk valve with a helical spring, wherein said valve is particularly suitable for the conveyance of sand-laden and highly contaminated watepr. Said valve has the disadvantage that it is not suitable for the conveyance of low-viscosity or gaseous fluids, in particular if the fluid flowing through the valve is still at a relatively high flow speed. Said known disk valve, operated with a gaseous fluid, has the disadvantage that a relatively high pressure loss arises at the disk valve. Furthermore, the disk valve, as soon as it opens, performs a rattling movement and constantly strikes the seat surface. To reduce the pressure loss of the disk valve, it is possible to enlarge the gap by lengthening the spring that holds the valve disk. This however has the result that an even more intense rattling movement occurs, and the valve disk strikes the seat surface correspondingly frequently and in a correspondingly intense manner, such that said disk valve exhibits a relatively high degree of wear.
>
> ## PRESENTATION OF THE INVENTION
>
> It is an object of the invention to design a poppet valve for a piston compressor which has more advantageous operating characteristics.
>
> The object is achieved in particular by means of a poppet valve for a piston compressor, comprising a valve body, preferably designed as a valve seat cover, wherein a multiplicity of inlet ducts is arranged in the valve body, wherein the inlet duct has an entrance section and an exit section, wherein the exit section opens into a valve seat, wherein each inlet duct is assigned a closing element and a spring, wherein the closing element is movable in an axial direction, and wherein, in relation to each valve seat, the associated closing element is arranged so as to be situated opposite in the axial direction, in such a way that the valve seat is closable by the closing element, wherein the spring has a first spring end section and a second spring end section, wherein the spring is arranged in the inlet duct, wherein the first spring end section is held on, and preferably bears against, the inlet duct, preferably the entrance section of the inlet duct, and wherein the second spring end section is connected to the closing element in order to subject the closing element to a preload force directed toward the valve seat.
>
> The poppet valve according to the invention has a closing element which, during operation, is moved substantially into defined positions, such that the likelihood of the closing element striking with an edge against the valve seat during the closing process is extremely low. Furthermore, a rattling movement is prevented. The poppet valve according to the invention therefore exhibits a very low degree of wear during operation. Furthermore, the closing element can be designed to be of very low mass or relatively light weight, which additionally reduces the wear in particular on the valve seat. The poppet valve comprises a spring which is arranged in the entrance duct of the valve body and to which the closing element is fastened. The closing element is advantageously held centrally by the spring, which reduces the likelihood of pivoting during operation. The spring and the entrance duct are advantageously designed in a manner adapted to one another such that, in the case of maximum deflection of the closing element, the spring bears against the entrance duct in the direction of the valve seat, such that the spring predefines a clearly defined position for the closing element even at maximum deflection. Furthermore, the shape of the valve seat and the shape of the surface of the closing element which comes to lie against the valve seat are advantageously designed so as to be adapted to one another such that the closing element is centered when it strikes the valve seat. This design has the advantage that the closing element assumes a defined position both in the closed position and in the fully open position, such that it is only in the transition phase between said two closed positions that the closing element can move freely within the boundary conditions predefined by the spring. The closing element therefore does not exhibit any rattling movement, exhibits low wear, and has a reproducible closing time.
>
> In an advantageous embodiment, the poppet valve according to the invention has a valve body in which inlet parts are arranged which form at least the inlet duct and the valve seat, wherein said inlet parts are designed as replaceable parts. In an advantageous embodiment, the valve body has apertures or holes in which the inlet parts can be arranged. This yields the advantage that, in the event of wear of the valve seat, it is necessary to replace not the entire valve body but only the inlet parts. The valve body may be of different form depending on the application, preferably of cover-like or hollow cylindrical form, for example in the form of part of a cylinder, or in some other form, for example in the form of part of a valve nest which is connected in fluid-conducting fashion to the interior space of a cylinder via a duct. In an advantageous embodiment, the inlet part, which is provided as a replaceable part or single-use part, is designed so as to form a prefabricated assembly which comprises not only the inlet part but also the spring and the closing element, such that an individual valve of a poppet valve that comprises multiple individual valves can be quickly replaced by replacing a defective individual valve with the prefabricated assembly.
>
> The poppet valve comprising a spring which is arranged in the entrance duct of the valve body and to which the closing element is fastened has the further advantage that it requires a very small structural depth in the direction of the compression chamber, because all of the components required for the function are arranged at the structural height of the valve body. This makes it possible to keep the dead space in the compressor very small.
>
> In a further advantageously designed poppet valve, a longitudinal guide is furthermore arranged below or above the inlet duct, advantageously outside and spaced apart from the valve seat, on which longitudinal guide the closing element is guided in its movement direction or in the axial direction in order to additionally prevent any tilting of the closing element. This embodiment is suitable in particular for poppet valves which exhibit a high flow speed and/or a high mass throughput.
>
> In a further advantageously designed poppet valve, a guide bar is provided along which the closing element moves and by means of which the closing element is guided, wherein the guide is designed preferably as a slide bearing. The guide bar preferably extends at least along a partial section, and in a further exemplary embodiment entirely, within the inlet duct. Such a longitudinal guide has the advantage that the closing element is guided in the inlet duct in a defined orientation without tilting. Said longitudinal guide furthermore has the advantage that the closing element can be designed to be very lightweight and of low mass.

The closing element is preferably designed such that the face surface directed toward the inlet duct is designed, and preferably also arranged, so as to be symmetrical, preferably rotationally symmetrical, with respect to the longitudinal axis. This embodiment has the advantage that the position of the open closing element is centered by means of the fluid flowing in via the inlet duct and flowing out between the valve seat and closing element.

In an advantageous embodiment, it would be possible for the piston compressor to be designed as a diaphragm compressor.

In an advantageous embodiment, it would be possible for a valve to be designed such that there is space for it in the structural depth of the valve body, and at the same time it preferably does not project on both sides of the valve body.

The invention will be described in detail below on the basis of exemplary embodiments.

BRIEF DESCRIPTION OF THE DRAWINGS

In the drawings used for explaining the exemplary embodiments:

FIG. 1 shows a face-on view of a closed poppet valve;

FIG. 2 shows a perspective longitudinal section through the poppet valve as per FIG. 1 along the section line B-B, wherein the closing elements are open;

In the drawings, identical parts are basically denoted by the same reference designations.

WAYS OF IMPLEMENTING THE INVENTION

Figure 3:
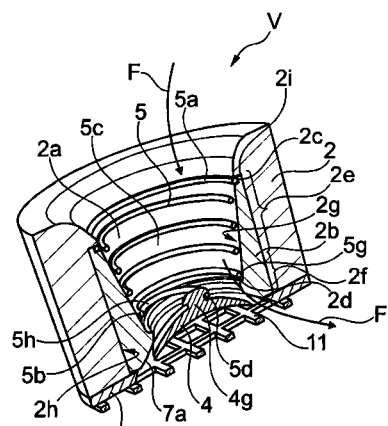
FIG. 3 shows a perspective longitudinal section through a single closing valve as per FIG. 2.

FIG. 1 shows a face-on view of a closed poppet valve 1 for a piston compressor, comprising a valve body which is designed as a valve seat cover 2 and in which there are arranged seven inlet ducts 2a which can be opened at the bottom by in each case one closing element 4, but which in the illustrated view are closed. Seven individual, identically designed valves are thus arranged in the valve seat cover 2. As illustrated in FIG. 2, the valves are at the entrance side connected preferably in fluid-conducting fashion to a common entrance chamber E, and are at the exit side connected preferably in fluid-conducting fashion to a common exit chamber G. Within each inlet duct 2a there is arranged a spring 5 which extends in spiral-shaped fashion and which extends along the wall of the inlet duct 2a or so as to be spaced apart from the wall of the inlet duct 2a and which, at the bottom, has a transition section 5h which projects into the center and which transitions into a holding section 5d. The closing element 4 has a, for example, projecting fastening section 4g to which the holding section 5d is connected such that the closing element 4 is held by the spring 5.

FIG. 2 shows a section along the section line B-B through the poppet valve 1 as per FIG. 1, wherein the closing elements 4 are illustrated in an open state. The poppet valve 1 comprises at least the valve body 2, designed as valve seat cover, with inlet ducts 2a, and also the spring 5 arranged in each inlet duct 2a and the closing element 4 assigned to each inlet duct 2a, which closing element is held movably in an axial direction A by the spring 5. The inlet duct 2a has an entrance section 2e. The inlet duct 2a furthermore has an exit section 2f, which opens into the valve seat 7a. The inlet duct 2a may be formed directly in the valve seat cover 2, as illustrated for example in FIG. 9. In the exemplary embodiment illustrated in FIG. 2, the valve body 2 has bores 2h and shoulders 2i, wherein each inlet duct 2a is formed substantially, that is to say with the exception of the entrance opening between the shoulder 2i and surface of the valve body 2, by an inlet part 2b which is inserted into the corresponding bores 2h in the valve body 2 and which is preferably replaceable. The inlet part 2b preferably also comprises the valve seat 7a. Arranged on the bottom of the valve body 2 is a holding plate 7 which can be removed for the purposes of replacing the inlet part 2b and which, in the mounted state, holds the inlet part 2b in the valve body 2.

FIG. 3 shows, in detail, a single one of the valves illustrated in FIGS. 1 and 2.

The inlet duct 2a is arranged in the valve seat cover 2, wherein the inlet duct 2a has an entrance section 2e and an exit section 2f, wherein the exit section 2f opens into a valve seat 7a. The closing element 4 is held movably in an axial direction A, wherein the closing element 4 is arranged so as to be situated opposite the valve seat 7a in the axial direction A, such that the valve seat 7a can be closed by means of the closing element 4. The spring 5 has a first spring end section 5a and a second spring end section 5b, wherein the spring 5 is arranged in the inlet duct 2a, wherein the first spring end section 5a bears against and is held on the entrance section 2e of the inlet duct 2a, or wherein the first spring end section 5a is held at least in the region of the entrance opening of the inlet duct 2a, for example in a depression 2c, and otherwise advantageously extends spaced apart from the inner side wall 2g, and wherein the second spring end section 5b is connected to the closing element 4 in order to subject the closing element 4 to a preload force directed toward the valve seat 7a.

The entrance section 2e advantageously has a depression 2c extending in a circumferential direction, preferably a groove, into which the first spring end section 5a engages in order to hold and preferably fasten the first spring end section 5a on the inlet duct 2a.

The spring 5 has a multiplicity of windings which are designed so as to extend helically and preferably, as illustrated, in spiral-shaped fashion, wherein at least some of the windings are spaced apart from one another so as to form an intermediate space 5c. The spring 5 is advantageously designed such that the fluid F flowing through is impeded only slightly by the spring 5, which is achieved for example in that the spring 5 predominantly bears against the inner side wall 2g of the inlet part 2b and in that the spring 5 has, in the region of the exit section 2f, a single transition section 5h projecting into the interior space of the inlet duct 2a, which transition section opens into the holding section 5d for holding the closing element 4. Thus, substantially only the transition section 5h of the spring 5 is flowed around at both sides by the fluid F. The spring section bearing against the inner wall is impinged on by a flow of fluid F substantially only at the side facing toward the interior space of the inlet duct 2a. The spring 5 may however also be arranged spaced apart from the inner side wall 2g and thus project into the interior space of the inlet duct 2a, wherein this scarcely increases the flow resistance owing to the small wire diameter of the spring 5.

The spring 5 preferably has, as illustrated, an external diameter which decreases in the axial direction A toward the exit section 2f. The inlet duct 2a preferably narrows from the entrance section 2e toward the exit section 2f. The spring 5 is advantageously composed of metal. The spring or the spring wire advantageously has a circular, oval or rectangular cross section, wherein, in the case of the rectangular cross section, the edges are advantageously rounded.

It is particularly preferable, as illustrated in FIG. 3, for the inlet duct 2a to have a conically extending inner side wall 2g, such that the internal diameter of the inlet duct 2a decreases toward the exit section 2f, and the spring 5 is designed to run in spiral-shaped fashion such that the spring 5 bears with multiple windings along the inlet duct 2a against the side wall 2e when the closing element 4 is fully open. This has the result that vibrations of the spring 5, which can occur during the opening process of the closing element 4 because the windings are not necessarily bearing against the inlet duct 2a during this phase, are prevented again when the closing element 4 is fully open. This embodiment has the advantage inter alia that the spring 5 can be held in the inlet duct 2a even without an encircling depression 2c, specifically preferably merely by virtue of the spring 5 that narrows in the direction of the outlet section 2f bearing against the conically narrowing inner side wall 2e.

As illustrated in FIG. 3, the valve seat 7a and the closing element 4 are preferably of mutually self-centering design, by virtue of the valve seat 7a forming a concavely or conically extending seat surface, and by virtue of the closing element 4 having a correspondingly adapted, convexly or conically extending closing head 4a.

Advantageously, and as illustrated in FIG. 3, the inlet duct 2a has, at the exit section 2f, a shoulder 2d extending in the circumferential direction, wherein furthermore, the second spring end section 5b has a support section 5g, followed by the transition section 5h and subsequently the holding section 5d. The holding section 5d is connected to the closing element 4. The support section 5g is designed such that it can bear against the shoulder 2d, and that the transition section 5h extends such that the closing element 4 is held centrally relative to the exit section 2f when the support section 5g bears against the shoulder 2d. It is thereby ensured that the fastening section 4g of the closing element 4, and thus also the closing element 4 as a whole, is held in a defined position in particular when the closing element 4 is fully open. This embodiment has the advantage that the position of the closing element 4 is defined, in the closed position, by the valve seat 7a and, in the fully open position, by the abutment of the support section 5g against the shoulder 2d. The position of the closing element 4 is thus defined in particular in relation to lateral deflection, that is to say perpendicular to the axial direction A, such that an uncontrolled deflection in this direction is prevented. Such lateral deflections of the closing element 4 are thus possible only when the closing element 4 is situated between the fully closed position and the fully open position.

As can be seen from FIGS. 2 and 3, a holding plate 7 may be arranged below the valve seat cover 2, which holding plate may for example also serve as a valve seat 7a or which holding plate, as illustrated in FIGS. 2 and 3, merely fixes the inlet part 2b in the valve seat cover 2. In an advantageous embodiment, as illustrated in FIGS. 2 and 3, a grid-like protective part 11 is arranged below the valve seat cover 2 in order in particular to prevent damaged parts of the spring 5 or of the closing element 3 from passing into a compression chamber, arranged below the valve seat cover 4, of the piston compressor. The poppet valve 1 illustrated in FIGS. 1 to 3 has the advantage that it requires scarcely any space below the valve seat cover 4, which yields the advantage that the dead space of the compression chamber of a piston compressor can be kept small.

Figure 4:
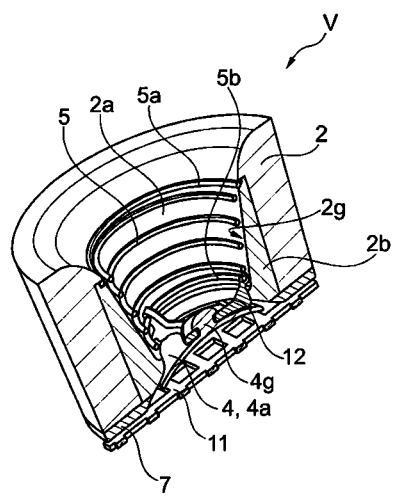
FIG. 4 shows a perspective longitudinal section through a second exemplary embodiment of a closing valve of a poppet valve.
Figure 5:
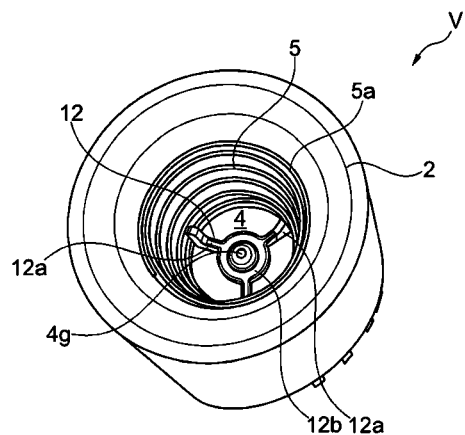
FIG. 5 shows a view of the entrance opening of the closing valve as per FIG. 4.

FIGS. 4 and 5 show a second exemplary embodiment of a central guide of the closing element 4 of a poppet valve 1. The poppet valve 1 comprises a centering part 12 with a central holder 12b and, proceeding from the central holder 12b, a multiplicity of holding arms 12a, wherein the holding arms 12a are connected to the second spring end section 5b and to the central holder 12b, and the closing element 4 connected thereto is held centrally relative to the exit section 2f of the inlet duct 2a. The central holder 12b is preferably connected, as illustrated in FIG. 4, at its peripheral end section to the spring end section 5b. The central holder 12b has an opening in which the fastening section 4g of the closing element 4 is held. The centering part 12 is thus a constituent part of the closing element 4, such that the spring end section 5b is connected to the closing element 4 via the centering part 12.

Figure 6:
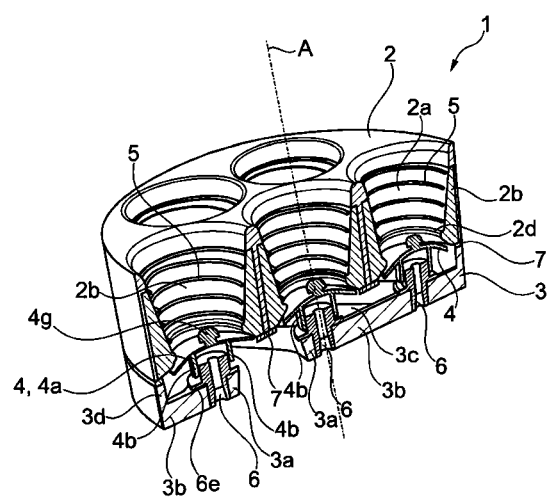
FIG. 6 shows a perspective longitudinal section through a third exemplary embodiment of a poppet valve.

FIG. 6 shows a third exemplary embodiment of a poppet valve 1 in section. By contrast to the poppet valve 1 illustrated in FIGS. 1 to 3, the poppet valve 1 illustrated in FIG. 6 has no protective part 11, and instead, a cage 3 which has struts 3b, junctions 3a and intermediate spaces 3c is arranged below the valve seat cover 2. At the junctions 3a, there are arranged guide parts 6, wherein the closing heads 4 each have a guide section 4b which laterally encloses the guide part 6, such that the closing head 4 is guided in the axial direction A on the guide part 6. In an advantageous embodiment, the guide part 6 is designed as a clip comprising a stop 6e, such that the guide part 6 can be removed from the cage 3 or fastened to the cage 3. Between the cage 3 and the valve seat cover 2 there is arranged a holding plate 7 which serves in particular for holding the inlet parts 2b.

Figure 7:
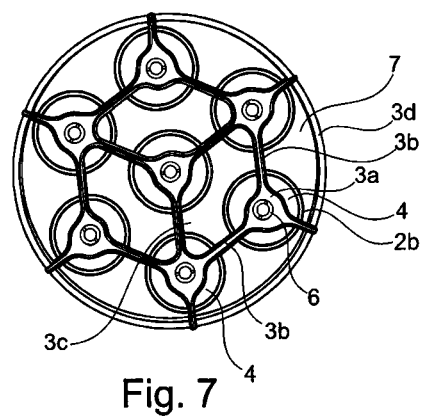
FIG. 7 shows a view of the poppet valve as per FIG. 6 from below.
Figure 8:
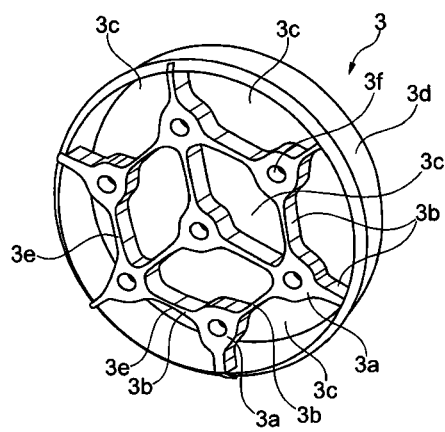
FIG. 8 shows a detail view of the cage as per FIGS. 6 and 7.

FIG. 7 shows the poppet valve 1 illustrated in FIG. 6 in a view from below. FIG. 8 shows the cage 3 illustrated in FIGS. 6 and 7 in detail. The cage 3 advantageously has a holding structure 3e which extends in a planar manner, wherein the holding structure 3e is preferably designed as a grid structure comprising a multiplicity of struts 3b and junctions 3a, wherein the guide parts 6 are arranged on and advantageously exchangeably fastened to the junctions 3a. The junction 3a advantageously has a bore 3f in which the guide part 6 is fastened or detachably fastenable. The illustrated cage 3 preferably has large intermediate spaces 3c, which yields the advantage that the fluid flowing in via the inlet ducts 2a can flow unhindered, or substantially unhindered, through the cage 3, such that only very small pressure losses arise. In an advantageous embodiment, the cage 3 comprises a hollow cylindrical outer wall 3d, which extends in the axial direction A and which encloses the holding structure 3e in the circumferential direction. The cage 3 thus also acts as a valve protection arrangement, also referred to as "valve guard". It would also be possible for a protective part 11 as illustrated in FIGS. 2 to 4 to be arranged below the cage 3.

Figure 9:
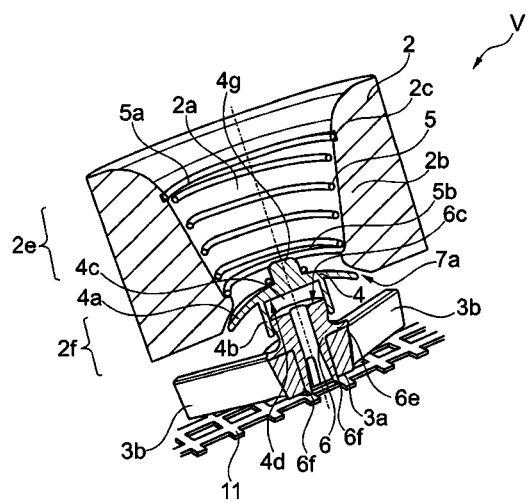
FIG. 9 shows a perspective longitudinal section through a fourth exemplary embodiment of a closing valve of a poppet valve.

FIG. 9 shows a fourth exemplary embodiment of a single closing valve of a poppet valve 1 in detail. By contrast to the exemplary embodiment illustrated in FIG. 6, no inlet part 2b is provided, such that the inlet duct 2a is formed only by the valve seat cover 2. Furthermore, no holding plate 7 is provided, such that the closing element 4 abuts directly against the valve seat 7a of the valve seat cover 2. Furthermore, a protective part 11 is arranged below the cage 3. FIG. 9 furthermore shows the functioning of the guide part 6 in combination with the closing element 4 in detail. The face side 4d and the face side 6c mutually form a stop which limits the maximum stroke of the closing element 4. In the exemplary embodiment illustrated, the guide part 6 has not only the stop 6e but also detent engagement parts 6f, such that the guide part 6 is connectable to the cage 3 by means of a clip connection. The exemplary embodiments of valves with inlet parts 2b as illustrated in FIGS. 1 to 6 and 10 could also be configured, as illustrated in FIG. 9, without an inlet part 2b, by virtue of the valve body 2 forming the inlet duct 2a and preferably also the valve seat 7a. It would however also be possible in all embodiments for the valve seat 7a to be formed by the holding plate 7, which extends as far as the valve seat 7a.

Figure 10:
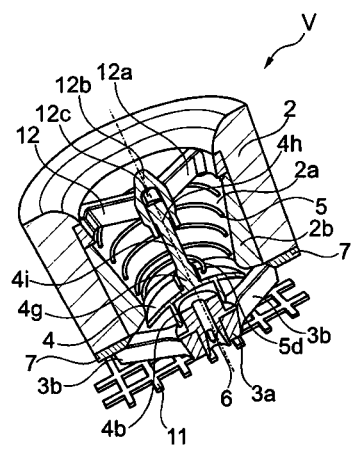
FIG. 10 shows a perspective longitudinal section through a fifth exemplary embodiment of a closing valve of a poppet valve.

FIG. 10 shows a fifth exemplary embodiment of a single closing valve of a poppet valve 1 which, by contrast to the exemplary embodiment illustrated in FIG. 9, also has an additional centering part 12 comprising holding arms 12a and a holder 12b with an internal guide 12c, wherein the closing element 4 furthermore comprises a fastening part 4i which ends in a slide section 4h. The centering part 12 is arranged in the entrance section 2e of the inlet duct 2a, and the slide section 4h is mounted slidingly in the axial direction A in the internal guide 12c, such that the closing element 4 is guided in a particularly effective and reliable manner in the axial direction A. The closing element 4 is held on the holding section 5d by the spring 5. In the exemplary embodiment illustrated in FIG. 10, it would also be possible for the guide part 6, the cage 3 and the guide section 4b to be omitted.

Figure 11:
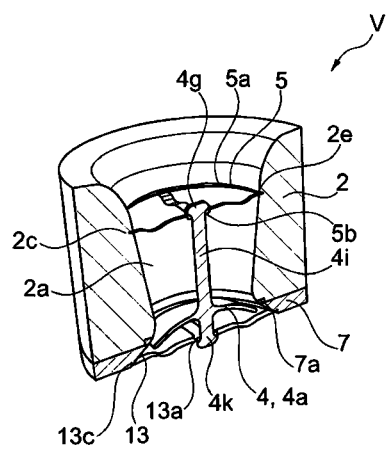
FIG. 11 shows a perspective longitudinal section through a sixth exemplary embodiment of a closing valve of a poppet valve.
Figure 12:
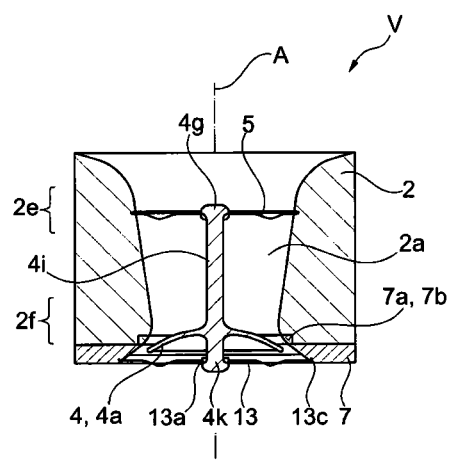
FIG. 12 shows a plan view of the section as per FIG. 11.

FIGS. 11 and 12 show a sixth exemplary embodiment of a single closing valve of a poppet valve 1, wherein the poppet valve 1 may comprise a multiplicity of, for example seven, such closing valves, as illustrated for example in FIG. 2. The closing valve illustrated in FIGS. 11 and 12 comprises a valve seat cover 2, a closing element 4 which is mounted movably in the axial direction A, a spring 5, and a second spring 13.

Figure 13:
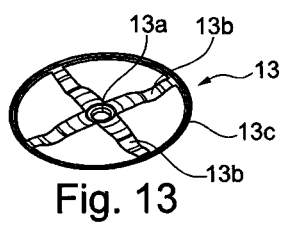
FIG. 13 shows a further exemplary embodiment of a spring.
Figure 14:
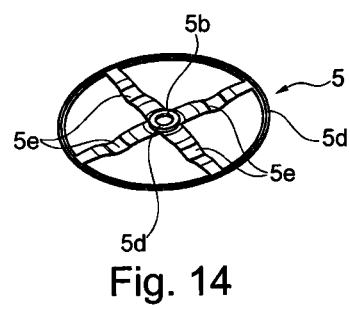
FIG. 14 shows a further exemplary embodiment of a spring.

The closing element 4 comprises a closing head 4a and a fastening part 4i extending in the axial direction A, wherein the fastening part 4i has a first and a second fastening section 4g, 4k which are spaced apart in the axial direction A and between which the closing head 4a is arranged. The first fastening section 4g is arranged in the entrance section 2e and is connected to the first spring 5 designed as a diaphragm spring, whereas the second fastening section 4k is held by a second spring 13 designed as a diaphragm spring, in order to hold the fastening part 4i centrally in the inlet duct 2a. The two springs 13 and 5 are illustrated in detail in FIGS. 13 and 14. The spring 5 comprises a first spring section 5a, a second spring section 5b and a multiplicity of spring arms 5e connecting said two sections 5a, 5b. The second spring section 5b simultaneously forms the holding section 5d, by means of which the fastening section 4g is held. The second spring 13 comprises a first spring section 13c, a second spring section 13a and a multiplicity of spring arms 13b connecting said two sections 13c, 13a. The valve seat cover 2 comprises, in the entrance section 2e, an encircling groove 2c in which the first spring section 5a is held. The holding plate 7 likewise comprises an encircling groove 13c, in which the second spring 13 is held, such that the closing element 4 held by the two springs 5, 13 is mounted movably in the axial direction A. For the guidance of the closing element 4, it would however also be possible, for example, for a cage 3 with guide parts 6 to be arranged in place of the spring 13, as illustrated in FIG. 6 or 9.

In a further exemplary embodiment, it would also be possible for the second spring 13 to be arranged between the first spring 5 and the closing head 4a, such that, as can be seen from FIG. 11 or 12, no second spring 13 would be arranged below the closing head 4a. In this embodiment, the second spring 13 would likewise be arranged within the entrance duct 2a, and preferably held in the entrance duct 2a by means of a groove running in the circumferential direction in the entrance duct 2a. In a further embodiment, a multiplicity of springs 5, 13 may be provided in order to hold the closing element 4 in the inlet duct 2a. Accordingly, it would be possible in FIG. 11 or 12 for one, two or even more additional diaphragm springs to be arranged between the closing head 4a and the first spring 5, and/or it would be possible in FIG. 11 or 12 for one or more additional diaphragm springs to be arranged between the closing head 4a and the second spring 13 in order to hold the closing element resiliently in the inlet duct 2a.

FIGS. 11 and 12 show a valve seat 7a which is designed as a valve seat ring 7b, wherein said valve seat ring 7b is arranged in a recess of the valve seat cover 2 and is held from below by the holding plate 7. In a further exemplary embodiment, it would however also be possible for the valve seat 7a to be formed by the holding plate 7 or by the valve body 2.

Figure 15:
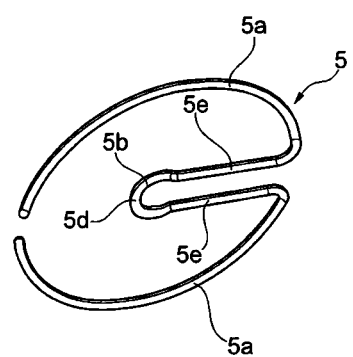
FIG. 15 shows a further exemplary embodiment of a spring.

The springs 5, 13 may be designed in different forms. FIG. 15 shows a further exemplary embodiment of a spring 5, which is suitable for the valve illustrated in FIGS. 11 and 12 and which comprises a first spring section 5a and a second spring section 5b, wherein the two spring sections 5a, 5b are connected to one another by means of two spring arms 5e. The spring section 5b serves as holding section 5d by means of which the spring 5 is connected to the closing element 4. In the exemplary embodiment illustrated in FIGS. 11 and 12, both springs 5, 13 may be designed in the manner of the spring 5 illustrated in FIG. 15.

Figure 16:
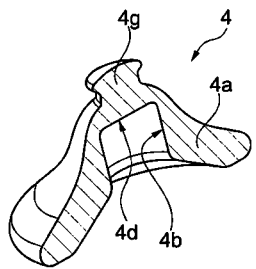
FIG. 16 shows a further exemplary embodiment of a closing element.

FIG. 16 shows a perspective longitudinal section through a further exemplary embodiment of a closing element 4 with closing head 4a, fastening section 4g, guide section 4b and stop 4d. The bell-shaped or arrow-shaped design makes it possible to realize a relatively deep guide section 4b within the structural height of the closing element 4, wherein said section projects relatively far into the interior space of the inlet duct 2a when the closing head 4a bears against the valve seat 7a. The embodiment of the closing element 4 illustrated in FIG. 16 has the advantage that the spacing between valve body 2 and cage 3 can be kept small because, as can be seen for example from FIG. 9, the guide part 6 would extend over a certain distance along the inlet duct 2a within the closing element 4, such that the distance between valve body 2 and cage 3 can be reduced, and the closing element 4 can nevertheless perform a stroke movement.

Figure 19:
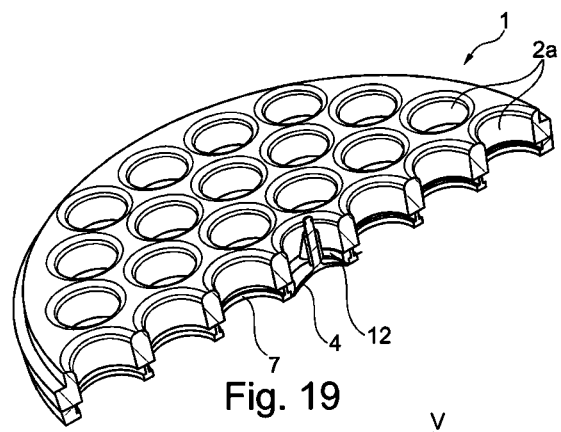
FIG. 19 shows a perspective longitudinal section through a poppet valve comprising closing elements as per FIGS. 17 and 18.

FIG. 19 shows, in a perspective longitudinal section, a further exemplary embodiment of a poppet valve 1, comprising a valve body 2 which is designed as a valve seat cover and which has a multiplicity of inlet ducts 2a, and comprising in each case one associated closing element 4 per inlet duct 2a. Furthermore, the poppet valve 1 comprises a holding plate 7, which holds each closing element 4 and a closing element centering part 12 on the valve body 2. In the case of the poppet valve 1, all inlet ducts 2a are to be provided with a closing element 4 with closing element centering part 12, wherein, for a better illustration, only a single closing element 4 with closing element centering part 12 is arranged in FIG. 19.

Figure 17:
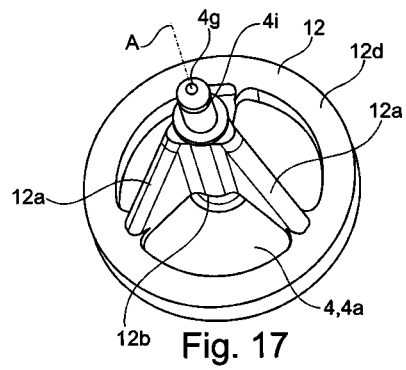
FIG. 17 shows a seventh exemplary embodiment of a closing element with a longitudinal guide.

FIG. 17 shows the closing element centering part 12 in detail, which closing element centering part comprises a holding ring 12d, three holding arms 12a and a closing element holder 12b, wherein the holding ring 12d is connected by means of the three holding arms 12a to the closing element holder 12b. The closing element holder 12b comprises a bore running in the axial direction A, which bore forms a slide bearing for the fastening part 4i.

Figure 18:
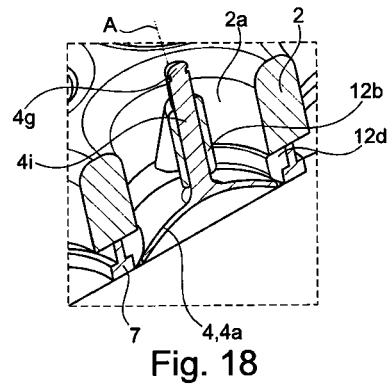
FIG. 18 shows the closing element as per FIG. 17 in an installed state.

FIG. 18 shows, in a perspective longitudinal section, the central section of the poppet valve 1 as per FIG. 19 in detail. The closing element 4 comprises a closing head 4a, which in the example illustrated is of spherical-cap-shaped design, and comprises the elongate, for example rod-shaped fastening part 4i, wherein the elongate fastening part 4i ends in a fastening section 4g. The holding ring 12d is held fixedly and advantageously detachably between the valve body 2 and the holding plate 7. In the exemplary embodiment illustrated, the holding ring 12d furthermore also forms the valve seat 7a. It would however also be possible for the valve seat 7a to be formed by the holding plate 7 or by an additional part. The closing element 4 is mounted movably in the axial direction A, wherein a spring 5 (not illustrated) having a first spring section 5a and a second spring section 5b subjects the fastening section 4g to a restoring force, wherein the restoring force acts upward in the view illustrated. The second spring section 5b is connected by means of its holding section 5d to the fastening section 4g. The first spring section 5a may for example, as illustrated in FIG. 3, be connected to the side wall of the inlet duct 2a, for example in a groove 2c arranged therein, or to a shoulder 2d, wherein the spring 5 is designed as a compression spring. It would for example also be possible for the first spring section 5a to bear against or be supported on the holding ring 12d and/or the holding arms 12a. The latter embodiment has the advantage that the entire closing mechanism of the valve, comprising the closing element 4, the valve seat 7, and the centering part 12 and the spring 5 is designed as a replaceable unit, which is connectable to the valve body 2 by means of the holding ring 12d. Such a closing mechanism is therefore easy to replace, and may for example also be designed as a disposable part.

Figure 20:
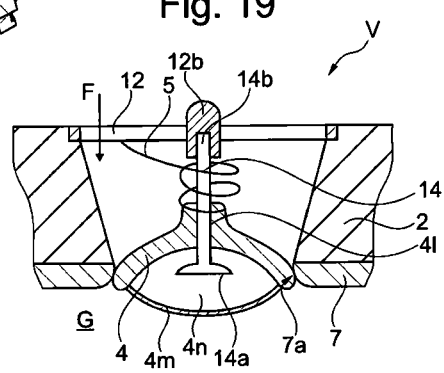
FIG. 20 shows a longitudinal section through an exemplary embodiment of a linearly guided closing valve of a poppet valve.

FIG. 20 shows a longitudinal section through a further exemplary embodiment of a single valve V, of which a multiplicity could be arranged in a valve body 2, as illustrated for example in FIG. 1. The valve body 2 comprises an inlet duct 2a. Arranged on the bottom of the valve body 2 is a plate 7 that also forms the valve seat 7a. The spring 5 and the closing element 4 are arranged and designed as illustrated in FIG. 3, with the difference that the closing element 4 has, at the top, a bore 41 through which there extends a guide rod 14 which has a lower stop 14a and an upper fastening point 14b. The stop rod 14 forms a fixed axle along which the closing element 4 is mounted so as to be slidingly movable in a linear direction. The valve furthermore comprises a centering part 12 arranged and designed as illustrated in FIG. 10, but with the difference that the centering guide 12c permits a fixed connection of the upper fastening point 14b to the holder 12b, for example by virtue of the fastening point 14b having an external thread and the holder 12b having an internal thread. The guide rod 14 is fastened and arranged such that the lower stop 14a limits the maximum stroke travel of the closing element 4 in the axial direction A. The closing element 4 furthermore also comprises a cover 4m which seals off the interior space 4n in a downward direction, such that the interior space 4n is connected via the bore 41 in fluid-conducting fashion to the inlet duct 2a, but without the exit chamber G being connected in fluid-conducting fashion to the interior space 4n.

Figure 21:
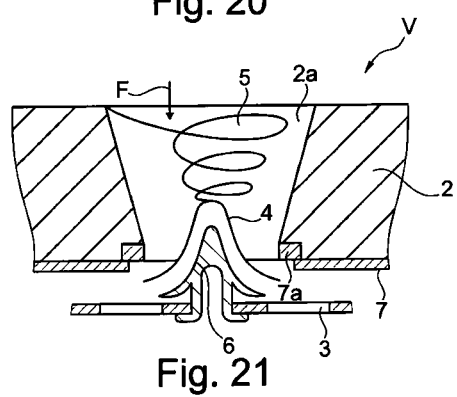
FIG. 21 shows a longitudinal section through a further exemplary embodiment of a closing valve of a poppet valve.

FIG. 21 shows a longitudinal section through a further exemplary embodiment of a single valve. The valve body 2 comprises an inlet duct 2a. A plate 7 is arranged on the bottom of the valve body 2. The closing element 4 is of trumpet-shaped design. The closing element 4 is, as illustrated in FIG. 3, held by means of a spring 5 which is connected at one side to the inlet duct 2a and which is connected at the other side to the closing element 4. The valve furthermore comprises a cage 3 on which a guide part 6 is arranged. The guide part is designed in a manner adapted to the profile of the closing element 4 in order to bring the closing element 4 into a defined central position when the closing element 4 is fully open, and in order to partially guide the closing element 4 in the event of severe inclinations during the opening and closing processes. The trumpet-shaped design of the closing element 4 has the advantage that the fluid F flowing through holds the closing element 4 in a central position in a particularly effective manner.

Figure 22:
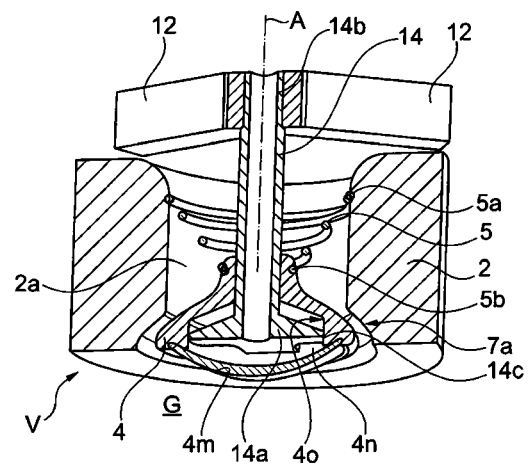
FIG. 22 shows a longitudinal section through a further exemplary embodiment of a linearly guided closing valve of a poppet valve.

FIG. 22 shows a longitudinal section through a further exemplary embodiment of a valve V with a linearly guided closing element 4. The valve body 2 comprises an inlet duct 2a and, in the exemplary embodiment illustrated, furthermore forms the valve seat 7a. Arranged so as to join or so as to be spaced apart from the valve body 2, there is a centering part 12 to which the guide rod 14 is fixedly connected by means of the upper fastening point 14b, such that the guide rod 14 extends preferably centrally through the inlet duct 2a and is held fixedly. The guide rod 14 ends, at the opposite end, at a stop 14a which, radially to the outside, has a second guide surface 14c. The closing element 4 is movable on the guide rod 14 in a linear direction and is mounted slidingly on the guide rod 14, and is limited in terms of its stroke height by the stop 14a and the valve seat 7a. The closing element 4 furthermore has an inner surface 4o, wherein said inner surface 4o and the second guide surface 14c are arranged and designed in a manner adapted to one another so as to form an additional guide in the axial direction A. The illustrated embodiment, in which the closing element 4 is guided directly on the guide rod 14 and additionally with the second guide surface 14c on the inner surface 4o, has the advantage that this yields a particularly precise linear guide and/or that the closing element can be designed to be particularly lightweight or to have a particularly low mass. It would however also be possible to omit the second guide point comprising the second guide surface 14c and the inner surface 4o. A spring is connected at the first spring end section 5a to the inner wall of the inlet duct 2a and by means of the second spring end section 5b to the closing element 4. Instead of the illustrated centering part 12, it would also be possible to use the centering part 12 illustrated in FIG. 20 in order to hold the guide rod 14 in the inlet duct 2a. In the exemplary embodiments as per FIGS. 20 and 22, the closing element 4 is mounted slidingly on the guide rod 14, whereas, in the exemplary embodiment as per FIGS. 17 and 18, the guide rod 4i forms part of the closing element 4. The exemplary embodiments as per FIGS. 20 and 22 therefore have the advantage that the closing element 4 has a lower moving mass. The stop 14a has a relatively large area, which yields the advantage that little wear occurs on the closing element 4 and the guide rod 14 during the operation of the valve V. The closing element 4 is closed off by a cover 4m, a pressure-tight spherical cap. The pressure-tight spherical cap is formed for example as a sheet-metal part which is clipped into the closing element 4. The closing element 4 is preferably composed of a plastic. The centering part 12 preferably forms a tripod, such that it is supported, for example bears against the valve body 2, at three points. The embodiment illustrated in FIG. 20 is advantageous in particular if it is used as a suction valve, because in this way the dead space can be kept very small. In an advantageous embodiment, a protective part 11, for example a protective grid, is furthermore arranged below the valve body 2, in order to retain any parts of the spherical cap 4m, of the closing element 4 or of the spring 5 that become detached.

Figure 23:
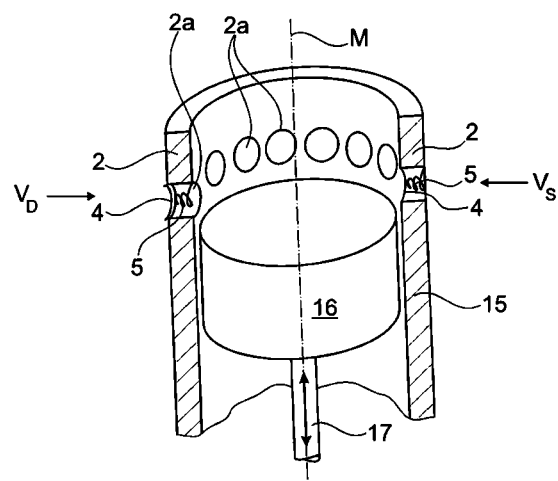
FIG. 23 shows a poppet valve having a cylindrical valve body with a multiplicity of valves.

FIG. 23 shows a longitudinal section through a piston compressor comprising a cylinder 15, a piston 16, and a piston rod 17, wherein the piston 16 is mounted so as to be movable back and forth in the direction of extent of the central axis M of the cylinder 15. Arranged so as to adjoin the cylinder 15 at the top is a hollow cylindrical valve body 2, having a multiplicity of valves V which are arranged spaced apart from one another in the circumferential direction. The individual valves V are designed for example as illustrated in FIG. 3, wherein the holding plate 7 is of hollow cylindrical design and encloses the cylinder 15. The protective part 11 is not illustrated. Said protective part could enclose the holding plate 7. It would also be possible for the protective part 11 to be dispensed with. FIG. 22 shows, at the top left, a valve V which is arranged as a pressure valve $V_D$, in the case of which the inlet ducts 2a begin at the inner side of the cylinder 15, such that the closing elements 4 are arranged toward the outside. The inlet ducts 2a extend preferably radially with respect to the central axis M of the cylinder 15. The valves V may also be arranged in a reversed manner, as illustrated at the top right in FIG. 23, wherein the inlet ducts 2a begin at the outer side, and the closing elements 4 are arranged toward the inner side of the cylinder 15, such that the valve V acts as a suction valve $V_S$. It would also be possible for the valve body 2 to be designed as part of the cylinder 15, for example by virtue of the cylinder 15 having bores in which, for example, in each case one inlet part 2b with spring 5 and closing element 4 is arranged, as illustrated for example in FIG. 2. It would furthermore be possible, as illustrated at the top in FIG. 23, for a further hollow cylindrical valve body 2 comprising valves to be arranged below the cylinder 15 in the direction of extent of the central axis M, in particular if the cylinder 15 is of double-acting design. For the valves, it would for example also be possible to use a valve with a linear guide of the closing element 4, as illustrated for example in FIG. 20. Depending on requirements, the valves V may be arranged in the valve body 2 or in the cylinder 15 as pressure valves $V_D$ and/or as suction valves $V_S$. There are numerous possibilities for the arrangement of the pressure valves $V_D$ and of the suction valves $V_S$. For example, in FIG. 23, it would be possible for every second one of the valves V arranged spaced apart in the circumferential direction to be designed as a pressure valve $V_D$ and for every second to be designed as a suction valve $V_S$, such that in each case one pressure valve $V_D$ and one suction valve $V_S$ are arranged so as to follow one another in the circumferential direction. In a further exemplary embodiment, it would be possible for all of the pressure valves $V_D$ or all of the suction valves $V_S$ to be arranged in the circumferential direction with respect to the central axis M along a predefined angle of for example 90°, 180° or 360°. Accordingly, it would for example be possible in FIG. 23 for all of the pressure valves $V_D$ to be arranged along 180° and subsequently for all of the suction valves $V_S$ to be arranged along 180°, such that all of the valves V are arranged in the cylinder 15 or in the valve body 2 at the same height in the direction of extent of the central axis M. In a further exemplary embodiment, the valves V may also be arranged offset in the direction of extent of the central axis M, such that for example the pressure valves $V_D$ are arranged along a predefined angle of for example 90°, 180° or 360°, and such that the suction valves $V_S$ are arranged along a predefined angle of for example 90°, 180° or 360° but so as to be offset in the direction of extent of the central axis M. It would also be possible for the pressure valves $V_D$ and suction valves $V_S$ to be arranged one behind the other in the circumferential direction and so as to be offset in the direction of extent of the central axis M. It would furthermore be possible for the pressure valves $V_D$ and suction valves $V_S$ to be arranged in groups, for example by virtue of 2 valves V being designed as pressure valves $V_D$, and the respective third valve V being designed as a suction valve $V_S$, in the circumferential direction.

Figure 24:
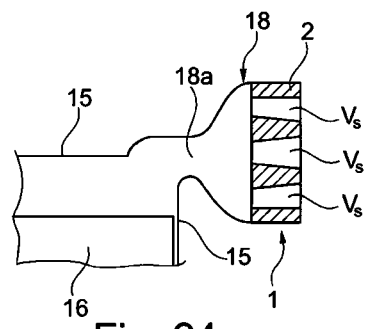
FIGS. 24 to 26 show a poppet valve having further embodiments of valve bodies with a multiplicity of valves.
Figure 25:
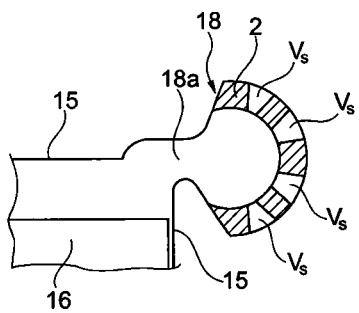
Figure 26:
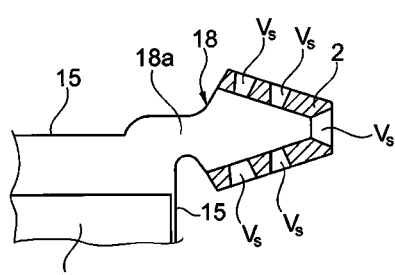

FIGS. 24 to 26 show further exemplary embodiments of a poppet valve 1 comprising in each case one valve body 2 with a multiplicity of suction valves $V_S$ arranged thereon or therein. The poppet valve 1 is connected in fluid-conducting fashion to the interior space formed from a cylinder 15 and a piston 16 via a so-called valve nest 18 and an inlet duct 18a. The exemplary embodiments show only suction valves $V_S$. It would however also be possible to provide an arrangement of only pressure valves $V_D$, such that the interior space opens out via an outlet duct 18a and the valve nest 18 to the poppet valve 1. In the exemplary embodiments as per FIGS. 24 to 26, both suction valves $V_S$ and pressure valves $V_D$ may be arranged in the poppet valve 1 or in the valve body 2, such that an inlet and outlet duct 18a connects the cylinder interior space to the valve nest and to the poppet valve 1.

The valve body 2 may be designed in a multiplicity of embodiments, for example may also be designed to be spherical, such that the exemplary embodiments of valve bodies 2 illustrated in FIGS. 2 and 23 to 26 are to be understood merely as examples. An advantage of the poppet valve 1 according to the invention can be seen in the fact that the valve body 2 may have a multiplicity of shapes in which the valves V are arranged as illustrated in the exemplary embodiments. The poppet valve 1 according to the invention may, depending on requirements, have suction or pressure valves $V_S$, $V_D$ or a combination of both valves.

The invention claimed is:

1. A poppet valve for a piston compressor, comprising a valve body with a multiplicity of inlet ducts, wherein each inlet duct has an entrance section and an exit section, wherein the exit section opens into a valve seat, wherein each inlet duct is assigned a closing element and a spring, wherein the closing element is movable in an axial direction (A), and wherein, in relation to each valve seat, the associated closing element is arranged so as to be situated opposite in the axial direction (A), in such a way that the valve seat is closable by the closing element, wherein the spring is arranged on one side in relation to the closing element, wherein the spring has a first spring end section and a second spring end section, wherein the spring is arranged in the inlet duct, wherein the spring has a multiplicity of windings which are designed to extend in helical or spiral-shaped fashion, and wherein at least some of the windings are spaced apart from one another so as to form an intermediate space, wherein the first spring end section is held on the inlet duct, and wherein the second spring end section is connected to the closing element in order to subject the closing element to a preload force directed toward the valve seat, wherein the first spring end section bears against and is held on the entrance section of the inlet duct.

2. The poppet valve as claimed in claim 1, wherein the valve body is designed as a valve seat cover.

3. The poppet valve as claimed in claim 1, wherein the valve body extends in a circumferential direction about a central axis (M) and is of hollow cylindrical design with respect to the central axis (M).

4. The poppet valve as claimed in claim 1, wherein a centering part projects into the inlet duct, and in that the first spring end section bears against and is held on the centering part.

5. The poppet valve as claimed in claim 4, wherein the entrance section has a depression which extends in the circumferential direction and into which the first spring end section engages in order to hold the first spring end section on the inlet duct.

6. The poppet valve as claimed in claim 1, wherein the spring has an external diameter which decreases in the axial direction (A) toward the exit section, and in that the inlet duct narrows from the entrance section toward the exit section.

7. The poppet valve as claimed in claim 6, wherein the inlet duct has a conically extending inner side wall, and the internal diameter of the inlet duct decreases toward the exit section, and in that the spring is designed to extend in spiral-shaped fashion such that the spring bears with multiple windings along the inlet duct against the side wall.

8. The poppet valve as claimed in claim 1, wherein the valve seat and the closing element are of mutually self-centering design by virtue of the valve seat having a concavely or conically extending seat surface and by virtue of the closing element having a correspondingly adapted, convexly or conically extending closing head.

9. The poppet valve as claimed in claim 1, wherein the inlet duct has, at the exit section, a shoulder extending in the circumferential direction, in that the second spring end section has a support section, followed by a transition section and subsequently a holding section, in that the holding section is connected to the closing element, in that the support section is designed such that the support section can bear against the shoulder, and in that the transition section extends such that the closing element is held centrally relative to the exit section when the support section bears against the shoulder.

10. The poppet valve as claimed in claim 1, wherein a centering part comprises a central holder and, proceeding from the central holder, a multiplicity of holding arms, wherein the holding arms are connected to the second spring end section and hold the central holder, and the closing element connected thereto, centrally relative to the exit section of the inlet duct.

11. The poppet valve as claimed in claim 1, comprising a cage, wherein the cage is arranged so as to follow the valve body and the closing element in the axial direction (A), wherein, in the cage, there is arranged a guide part which extends in the axial direction (A) and on which the closing element is mounted slidingly in the axial direction (A).

12. The poppet valve as claimed in claim 11, wherein the cage has an an axially extending holding structure on which the guide parts are arranged so as to project in the axial direction (A), wherein the holding structure has intermediate spaces, wherein the holding structure is designed in particular as a grid structure comprising a multiplicity of struts and junctions and intermediate spaces.

13. The poppet valve as claimed in claim 1, wherein the valve seat is designed as a separate valve seat ring which is arranged in the valve body.

14. The poppet valve as claimed in claim 1, wherein, in the valve body, there are arranged a multiplicity of inlet parts which are connected detachably and exchangeably to the valve body, wherein each inlet part surrounds the inlet duct.

15. The poppet valve as claimed in claim 14, wherein the valve seat is part of the inlet part, or in that the inlet part has a groove in which the valve seat is arranged.

16. The poppet valve as claimed in claim 1, wherein a centering part projects into the inlet duct, wherein the centering part comprises a linear guide which extends in the direction of the axis (A), and in that the closing element comprises a rod-shaped fastening section which is mounted in the linear guide movably in the direction of the axis (A).

17. The poppet valve as claimed in claim 1, wherein the inlet ducts, the valve seats and the closing elements are arranged in the same valve body such that the valve body comprises both a suction valve ($V_s$) and a pressure valve ($V_D$).

18. A piston compressor comprising a poppet valve as claimed in claim 1.

* * * * *